United States Patent
Ding et al.

(10) Patent No.: US 11,281,898 B2
(45) Date of Patent: Mar. 22, 2022

(54) ARM ACTION IDENTIFICATION METHOD AND APPARATUS AND IMAGE PROCESSING DEVICE

(71) Applicant: FUJITSU LIMITED, Kawasaki (JP)

(72) Inventors: Lan Ding, Beijing (CN); Zhiming Tan, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/886,147

(22) Filed: May 28, 2020

(65) Prior Publication Data
US 2020/0410221 A1    Dec. 31, 2020

(30) Foreign Application Priority Data

Jun. 28, 2019 (CN) .......................... 201910572171.4

(51) Int. Cl.
| | |
|---|---|
| G06T 7/60 | (2017.01) |
| G06K 9/00 | (2022.01) |
| G06T 7/246 | (2017.01) |
| G06T 7/73 | (2017.01) |

(52) U.S. Cl.
CPC ..... G06K 9/00355 (2013.01); G06K 9/00375 (2013.01); G06T 7/248 (2017.01); G06T 7/60 (2013.01); G06T 7/74 (2017.01); *G06T 2207/30196* (2013.01)

(58) Field of Classification Search
CPC .. G06K 9/44; G06K 9/00355; G06K 9/00375; G06T 7/74; G06T 7/73
See application file for complete search history.

(56) References Cited

U.S. PATENT DOCUMENTS

| | | | | |
|---|---|---|---|---|
| 2013/0069867 A1* | 3/2013 | Watanabe | ............. | G06F 3/0482 |
| | | | | 345/156 |
| 2014/0334670 A1 | 11/2014 | Guigues et al. | | |
| 2019/0176820 A1* | 6/2019 | Pindeus | ................ | B60W 30/09 |

FOREIGN PATENT DOCUMENTS

| | | |
|---|---|---|
| CN | 106774820 A | 5/2017 |
| CN | 108205654 A | 6/2018 |
| CN | 108229355 A | 6/2018 |

OTHER PUBLICATIONS

Yan Li-Min et al., "Key Feature Point Extraction Based on Depth Data", Industrial control computer, vol. 28, No. 11, 2015; (3 pages).

* cited by examiner

*Primary Examiner* — Sam Bhattacharya
(74) *Attorney, Agent, or Firm* — Staas & Halsey LLP (57) ABSTRACT

Embodiments of this disclosure provide an arm action identification method and apparatus and an image processing device. A human body detection is performed on an image to obtain multiple key points of the human body in the image. An arm action is identified to be an upward action or a downward action by using a shoulder key point, an elbow key point and a wrist key point in the multiple key points. Arm actions indicative of upward, downward, or forward, actions may be identified based upon, for example, lifting, putting down, holding forward, actions, by using the key points of the human body, thereby achieving computer-level action identification, and lowering complexity of computation.

16 Claims, 6 Drawing Sheets

---

101 human body detection is performed on an image to be detected, so as to obtain multiple key points of each human body in the image

102 whether an arm action is upward or downward is identified by using a shoulder key point, an elbow key point and a wrist key point in the multiple key points

ARM ACTION IDENTIFICATION METHOD AND APPARATUS AND IMAGE PROCESSING DEVICE

CROSS-REFERENCE TO RELATED APPLICATIONS

This application claims priority under 35 USC 119 to Chinese patent application no. 201910572171.4, filed on Jun. 28, 2019, in the China National Intellectual Property Administration, the entire contents of which are incorporated herein by reference.

FIELD

This disclosure relates to the field of action identification technologies.

BACKGROUND

Nowadays, with surveillance cameras, humans may be monitored anywhere in a room. However, identifying abnormal situations, such as violent crimes in public places, and unsafe behaviors on aircrafts, etc. is still necessary. However, as more cameras are set up, it is difficult for humans to take into consideration too many monitors. Therefore, it is necessary to enable computers to identify human behaviors.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in most of the time, human arm actions may represent human upper body movements. Therefore, in order to perform further motion identification, it is necessary to identify human arm movements.

In order to solve at least one of the above problems, embodiments of this disclosure provide an arm action identification method and apparatus and an image processing device, so as to achieve computer-level action identification, and lower complexity of computation.

According to a first aspect of the embodiments of this disclosure, there is provided an arm action identification method by which human body detection is performed on an image to be detected, so as to obtain multiple key points of each human body in the image; and whether an arm action is upward or downward is identified by using a shoulder key point, an elbow key point and a wrist key point in the multiple key points.

According to a second aspect of the embodiments of this disclosure, there is provided an arm action identification apparatus, the apparatus including a detecting unit configured to perform human body detection on an image to be detected, so as to obtain multiple key points of each human body in the image; and a first identifying unit configured to identify whether an arm action is upward or downward by using a shoulder key point, an elbow key point and a wrist key point in the multiple key points.

According to a third aspect of the embodiments of this disclosure, there is provided an image processing device, including the arm action identification apparatus as described in the second aspect.

According to a fourth aspect of the embodiments of this disclosure, there is provided a computer readable program, which, when executed in an arm action identification apparatus or an image processing device, will cause the arm action identification apparatus or the image processing device to carry out the arm action identification method as described in the first aspect.

According to a fifth aspect of the embodiments of this disclosure, there is provided a medium, including a computer readable program, which will cause an arm action identification apparatus or an image processing device to carry out the arm action identification method as described in the first aspect.

An advantage of the embodiments of this disclosure exists in that in the embodiments of this disclosure, arm actions indicative of upward, downward, or forward, actions may be identified based upon, for example, lifting, putting down, holding forward, etc., actions, by using the key points of the human body, thereby achieving computer-level action identification, and lowering complexity of computation.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various implementations of the embodiments of this disclosure shall be described below with reference to the accompanying drawings. These implementations are illustrative only, and are not intended to limit this disclosure.

Embodiment 1

Figure 1:
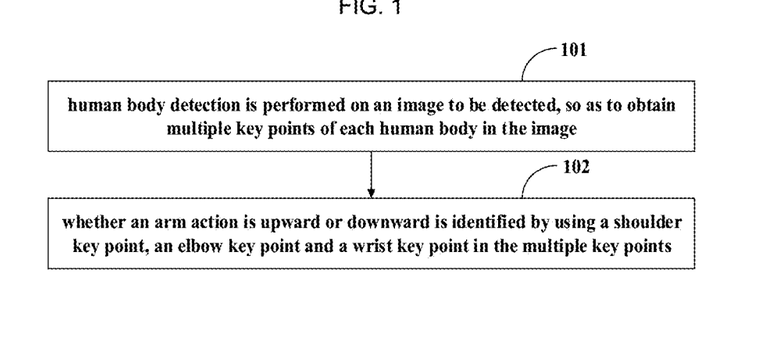
FIG. 1 is a schematic diagram of the arm action identification method of Embodiment 1.

This embodiment provides an arm action identification method. FIG. 1 is a schematic diagram of the arm action identification method of Embodiment 1 of this disclosure. Referring to FIG. 1, the method includes:

101: human body detection is performed on an image to be detected, so as to obtain multiple key points of each human body in the image; and

102: whether an arm action is upward or downward is identified by using a shoulder key point, an elbow key point and a wrist key point in the multiple key points.

In the embodiments of this disclosure, whether the arm action is upward or downward is identified by using the shoulder point, the elbow key pint and the wrist key point of the human body, thereby achieving computer-level action identification in a simple manner, and lowering complexity of computation.

In some embodiments, the image to be detected may be an image captured by a surveillance camera in real time. In particular, it may be an image stored in a memory after being captured, or an image buffered during being captured, and this embodiment is not limited thereto.

In operation 101, a cascaded pyramid network (CPN) may be used to perform human detection on the above image to obtain 17 key points of each human body in the image. Reference may be made to the related art for an operational principle of the CPN, which shall not be described herein any further.

Figure 2:
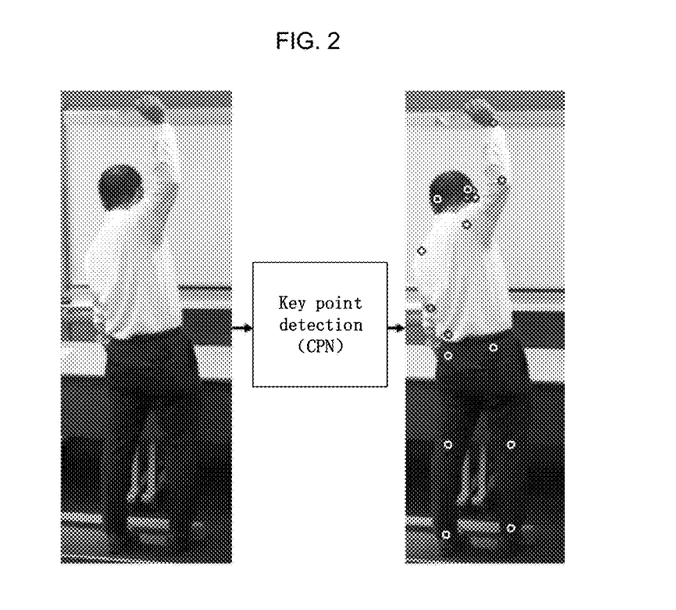
FIG. 2 is a schematic diagram of key point detection.

FIG. 2 is a schematic diagram of performing human detection on the image by using the CPN. As shown in FIG. 2, the left side is the image to be detected. By performing human body detection on the image to be detected by using the CPN, i.e. key point detection, 17 key points of the human body may be obtained. As shown on the right side of FIG. 2, the 17 key points are: left eye, right eye, left ear, right ear, nose, left shoulder, right shoulder, left elbow, right elbow, left wrist, right wrist, left hip, right hip, left knee, right knee, left ankle, and right ankle. Information on the key points is embodied by the horizontal and vertical coordinates of the key points. That is, by the above human body detection, information on the horizontal and vertical coordinates of the key points may be obtained.

In some embodiments, the upward and downward movements of the arm of the human body are identified by using the shoulder key point, the elbow key point and the wrist key point in the 17 key points.

In some embodiments, the shoulder key point, elbow key point and wrist key point refer to key points on the same side of the human body, for example, they are a left shoulder key point, a left elbow key point and a left wrist key point, or they are a right shoulder key point, a right elbow key and a right wrist key point.

Figure 3:
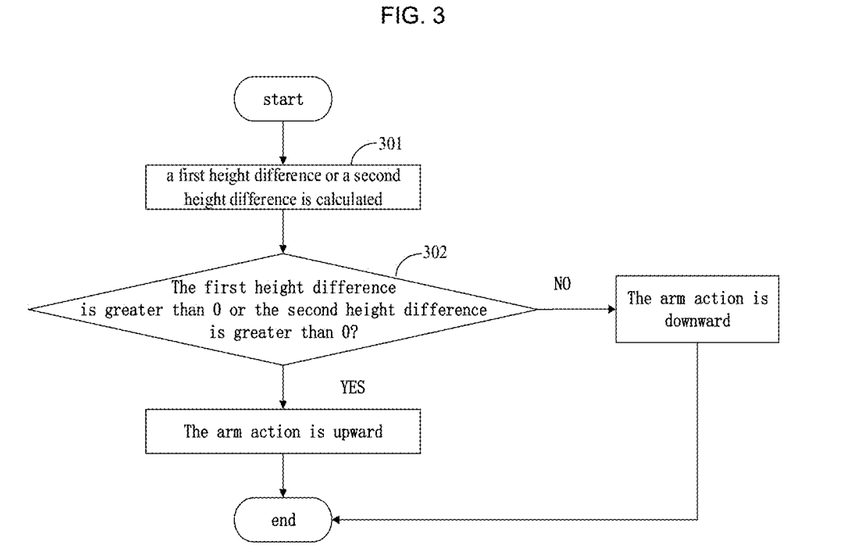
FIG. 3 is a schematic diagram of a method for identifying whether an arm action is upward or downward.

FIG. 3 is a schematic diagram of a judgment method of the embodiment of this disclosure. As shown in FIG. 3, the method includes:

301: a height difference between the wrist key point and the elbow key point is calculated and taken as a first height difference, or a height difference between the elbow key point and the shoulder key point is calculated and taken as a second height difference; and

302: whether the first height difference or the second height difference is greater than 0 is judged, and determines that the arm action is upward when it is judged yes, otherwise, determines that the arm action is downward.

In some embodiments, the above first height difference may be calculated by using the following formula:

$$dh\_we = y\_\text{wrist} - y\_\text{elbow};$$

where, dh_we is the first height difference, y_wrist is an ordinate of the wrist key point, and y_elbow is an ordinate of the elbow key point. The above y_wrist and y_elbow are obtained in operations of the above human body detection (key point detection).

In some embodiments, the above second height difference may be calculated by using the following formula:

$$dh\_es = y\_elbow - y\_shoulder;$$

where, dh_es is the second height difference, y_elbow is an ordinate of the elbow key point, and y_shoulder is an ordinate of the shoulder key point. Likewise, above y_elbow and y_shoulder are also obtained in the operations of the above human body detection (key point detection).

Figure 4:
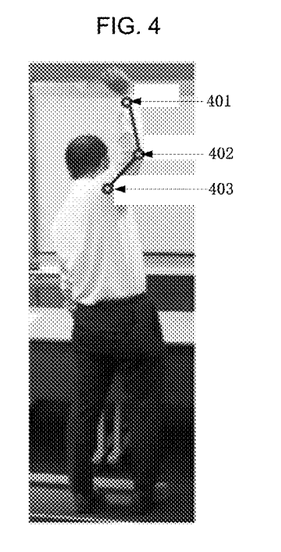
FIG. 4 is a schematic diagram of a scenario where whether an arm action is upward or downward is identified.
Figure 5:
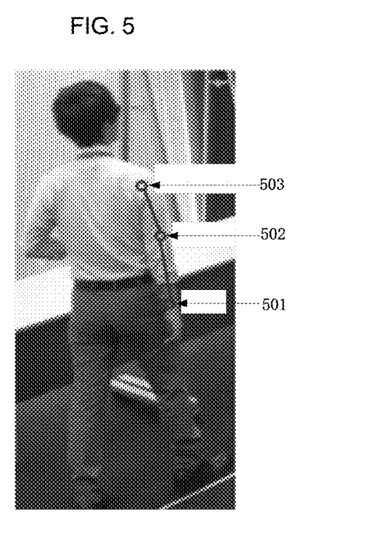
FIG. 5 is a schematic diagram of another scenario where whether an arm action is upward or downward is identified.

FIGS. 4 and 5 are schematic diagrams of performing arm action identification by using the method shown in FIG. 3. As shown in FIG. 4, as the height difference (the first height difference) between the wrist key point 401 and the elbow key point 402 is greater than 0, or the height difference (the second height difference) between the elbow key point 402 and the shoulder key point 403 is greater than 0, it is determined that the arm action of the human body in FIG. 4 is upward. As shown in FIG. 5, as the height difference (the first height difference) between the wrist key point 501 and the elbow key point 502 is equal to or less than 0, or the height difference (the second height difference) between the elbow key point 502 and the shoulder key point 503 is equal to or less than 0, it is determined that the arm action of the human body in FIG. 5 is downward.

With the method in the embodiment of this disclosure, whether the arm action of the human body is upward or downward may be identified by using the shoulder key point, the elbow key point and the wrist key point only in the 17 key points.

In some embodiments, whether the arm action of the human body is forward may be identified by using the shoulder key point, the elbow key point and the wrist key point in the 17 key points.

In some embodiments, the shoulder key point, elbow key point and wrist key point refer to key points on the same side of the human body, for example, they are a left shoulder key point, a left elbow key point and a left wrist key point, or they are a right shoulder key point, a right elbow key and a right wrist key point. As when the arm action is forward, a bending degree of the arm is relatively high, and the more the arm is bent, the closer the distance between the shoulder and the wrist is, as a result, in this embodiment, whether the arm action is forward is judged by the bending degree of the arm.

Figure 6:
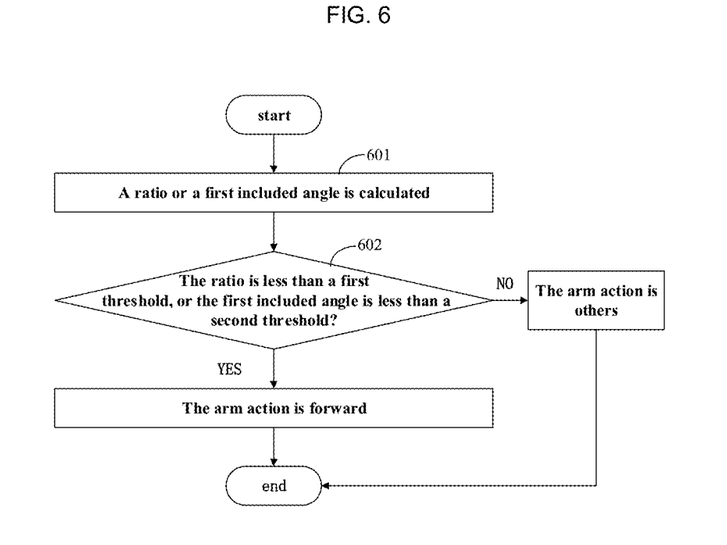
FIG. 6 is a schematic diagram of a method for identifying whether an arm action is forward.

FIG. 6 is another schematic diagram of the judgment method of the embodiment of this disclosure. As shown in FIG. 6, the method includes:

601: a ratio of a distance between the shoulder key point and the wrist key point to a sum of a distance between the shoulder key point and the elbow key point and a distance between the elbow key point and the wrist key point is calculated, or an included angle between a connecting line between the shoulder key point and the elbow key point and a connecting line between the elbow key point and the wrist key point is calculated and taken as a first included angle; and 602: whether the ratio is less than a first threshold or whether the first included angle is less than a second threshold is judged, determines that the arm action is forward when it is judged yes, otherwise, determines that the arm action is not forward.

In some embodiments, the distance between the shoulder key point and the wrist key point reflects a distance between the shoulder and the wrist, the sum of the distance between the shoulder key point and the elbow key point and the distance between the elbow key point and the wrist key point reflects a length of the arm, and a ratio of the distance between the shoulder and the wrist to the length of the arm may indicate the bending degree of the arm, the more the arm is bent, the smaller the ratio is. In the embodiment of this disclosure, whether the arm action is forward is judged by setting the above first threshold and comparing the ratio with the first threshold.

In some embodiments, the above ratio may be obtained through calculation by using the formula as below:

$$R = \frac{dist(\text{shoulder, wrist})}{dist(\text{shoulder, elbow}) + dist(\text{elbow, wrist})};$$

where, R is the above-described ratio, dist (k1, k2) is a distance between key points k1 and k2, k1 and k2 being the shoulder key point and the wrist key point, respectively, or being the shoulder key point and the elbow key point, respectively, or being the elbow key point and the wrist key point, respectively. The above distances refer to straight-line distance between the key points, and may be obtained through calculation according to horizontal and vertical coordinates of the key points, and a particular calculation method is not limited in the embodiment of this disclosure. In addition, the above formula is illustrative only, and a particular method for calculating the above ratio is not limited in the embodiment of this disclosure.

In some embodiments, the first threshold may be set empirically, for example, it may be set to be 0.9, which is not limited in the embodiment of this disclosure.

In some embodiments, in addition to the above ratio that is able to indicate the bending degree of the arm, the included angle (the first included angle) between the connecting line between the shoulder key point and the elbow key point and the connecting line between the elbow key point and the wrist key point can also indicate the bending degree of the arm. For example, the more the arm is bent, the smaller the first included angle is. In the embodiment of this disclosure, whether the arm action is forward may also be judged by setting the above second threshold and comparing the first included angle with the second threshold.

In some embodiments, the above first included angle may be obtained through calculation by using the formula as below:

$$\text{angel\_armbend} = \arccos\left(\frac{\vec{V}_{elbow \to shoulder} \cdot \vec{V}_{elbow \to wrist}}{|\vec{V}_{elbow \to shoulder}| \cdot |\vec{V}_{elbow \to wrist}|}\right);$$

where, angel_armbend is the first included angle, $\vec{V}_{elbow \to shoulder}$ is a vector point from the elbow key point to the shoulder key point, and $\vec{V}_{elbow \to wrist}$ is a vector point from the elbow key point to the wrist key point. The above vector points may be obtained through calculation according to the horizontal and vertical coordinates of the key points, and a particular calculation method is not limited in the embodiment of this disclosure. In addition, the above formula is illustrative only, and a particular method for calculating the above first included angle is not limited in the embodiment of this disclosure.

In some embodiments, the second threshold may also be set empirically, for example, it may be set to be 90 degrees, which is not limited in the embodiment of this disclosure.

Figure 7:
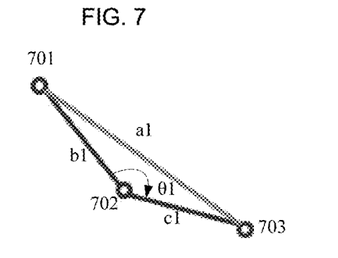
FIG. 7 is a schematic diagram of a shoulder key point, an elbow key point and a wrist key point.

FIG. 7 is a schematic diagram of the shoulder key point 701, the elbow key point 702 and the wrist key point 703. As shown in FIG. 7, assuming that the distance between the shoulder key point and the wrist key point is a1, the distance between the shoulder key point and the elbow key point is b1, and the distance between the elbow key point and the wrist key point is c1, the above ratio R=a1/(b1+c1) and the above first included angle θ1 are obtained through calculation. Assuming the first threshold is 0.9, the second threshold is 90 degrees, as R>0.9 and θ1>90°, that is, the bending degree of the arm is not large, it is determined that the arm action is not forward.

Figure 8:
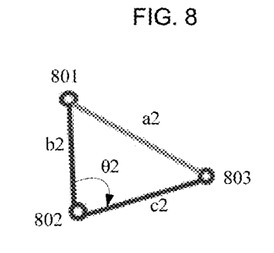
FIG. 8 is another schematic diagram of the shoulder key point, the elbow key point and the wrist key point.

FIG. 8 is another schematic diagram of the shoulder key point 801, the elbow key point 802 and the wrist key point 803. As shown in FIG. 8, assuming that the distance between the shoulder key point and the wrist key point is a2, the distance between the shoulder key point and the elbow key point is b2, and the distance between the elbow key point and the wrist key point is c2, the above ratio R=a2/(b2+c2) and the above first included angle θ2 are obtained through calculation. Assuming the first threshold is 0.9, the second threshold is 90 degrees, as R<0.9 and θ2<90°, that is, the bending degree of the arm is relatively large, it is determined that the arm action is forward.

Figure 9:
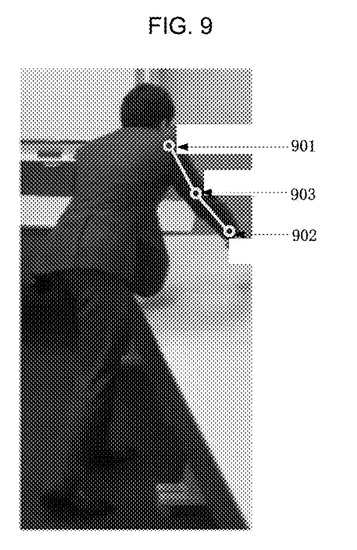
FIG. 9 is a schematic diagram of a scenario where whether an arm action is forward is identified.

FIG. 9 is a schematic diagram of performing arm action identification by using the method shown in FIG. 6. As shown in FIG. 9, the ratio of the distance between the shoulder key point 901 and the wrist key point 902 to the sum of the distance between the shoulder key point 901 and the elbow key point 903 and the distance between the elbow key point 903 and the wrist key point 902 is greater than the first threshold, or the included angle (the first included angle) between the connecting line between the shoulder key point 901 and the elbow key point 903 and the connecting line between the elbow key point 903 and the wrist key point 902 is greater than the second threshold, and it is determined that the arm action of the human body in FIG. 9 is not forward.

With the method of the embodiment of this disclosure, whether the arm action of the human body is forward is identified via the bending degree of the arm by using only the shoulder key point, elbow key point and wrist key point in the 17 key points.

In some embodiments, whether the arm action of the human body is forward may be identified by using the shoulder key point, the elbow key point and the wrist key point in the 17 key points.

In some embodiments, the shoulder key point, elbow key point and wrist key point refer to key points on the same side of the human body, for example, they are a left shoulder key point, a left elbow key point and a left hip key point, or they are a right shoulder key point, a right elbow key and a right hip key point. As when the arm action is forward, a lifting degree of the arm is relatively high, and the included angle in between the arm and the body is relatively large, hence, in this embodiment, whether the arm action is forward is judged according to the lifting degree of the arm.

Figure 10:
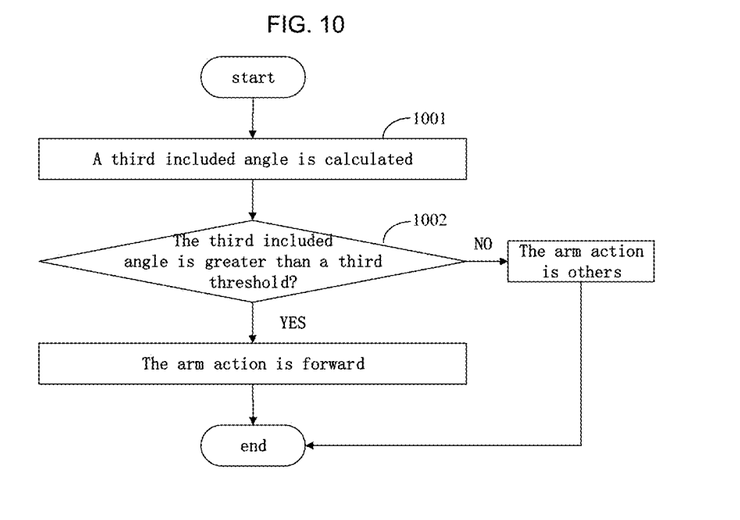
FIG. 10 is a schematic diagram of another method for identifying whether an arm action is forward.

FIG. 10 is another schematic diagram of the judgment method of the embodiment of this disclosure. As shown in FIG. 10, the method includes:

step 1001: an included angle between a connecting line between the shoulder key point and the elbow key point and a connecting line between the shoulder key point and the hip key point is calculated and taken as a second included angle;

step 1002: whether the second included angle is greater than a third threshold value is judged, and determines that the arm action is forward when it is judged yes, otherwise, determines that the arm action is not forward.

In some embodiments, the connecting line between the shoulder key point and the elbow key point reflects an upper arm of the human body, the connecting line between the shoulder key point and the hip key point reflects the body at the same side as the upper arm, and an included angle therebetween reflects a lifting degree of the arm, the higher the lifting degree of the arm, the larger the included angle is. In the embodiment of this disclosure, whether the arm action is forward is judged by setting the above third threshold and comparing the included angle with the third threshold.

In some embodiments, the above second included angle may be obtained through calculation by using the formula as below:

$$\text{angle\_ab} = \arccos\left(\frac{\vec{V}_{shoulder \to hip} \cdot \vec{V}_{shoulder \to elbow}}{|\vec{V}_{shoulder \to hip}| \cdot |\vec{V}_{shoulder \to elbow}|}\right);$$

where, angle_ab is the second included angle, $\vec{V}_{shoulder \to hip}$ is a vector point from the shoulder key point to the hip key point, and $\vec{V}_{shoulder \to elbow}$ is a vector point from the shoulder key point to the elbow key point. The above vector points may be obtained through calculation according to the horizontal and vertical coordinates of each key points, and a particular calculation method is not limited in the embodiment of this disclosure. In addition, the above formula is illustrative only, and a particular method for calculating the second included angle is not limited in the embodiment of this disclosure.

In some embodiments, the third threshold may be set empirically, for example, it may be set to be 20 degrees, which is not limited in the embodiment of this disclosure.

Figure 11:
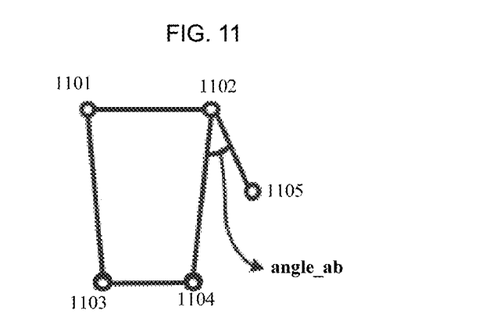
FIG. 11 is a schematic diagram of a shoulder key point, an elbow key point and a hip key point.

FIG. 11 is a schematic diagram of a left shoulder key point 1101, a right shoulder key point 1102, a left hip key point 1103, a right hip key point 1104 and a right elbow key point 1105. As shown in FIG. 11, a connecting line between the right elbow key point 1105 and the right shoulder key point 1102 and a connecting line between the the right shoulder key point 1102 and the right hip key point 1104 constitute an included angle angle_ab, which is the above-described second included angle. Whether the arm action is forward is determined by comparing the angle angle_ab with the third threshold. Taking that the third threshold is 20 degrees as an example, if the included angle angle_ab is greater than 20 degrees, it is determined that the arm action is forward, otherwise, it is determined that the arm action is not forward.

With the method of the embodiment of this disclosure, whether the arm action of the human body is forward is identified via the bending degree of the arm by using only the shoulder key point, elbow key point and hip key point in the 17 key points.

The methods in the embodiments of this disclosure are described above by taking FIGS. 3, 6 and 10 as examples. The above embodiments may be implemented separately or in a combined manner. For example, whether the arm action is upward or downward may be judged via the method of FIG. 3, and at the same time, whether the arm action is forward may be judged via the method of FIG. 6 or FIG. 10.

In the embodiment of this disclosure, arm actions indicative of upward, downward, or forward, actions may be identified based upon, for example, lifting, putting down, holding forward, etc., actions, by using the key points of the human body, thereby achieving computer-level action identification, and lowering complexity of computation.

Embodiment 2

The embodiment of this disclosure provides an arm action identification apparatus. As principles of the apparatus for solving problems are similar to that of the method in Embodiment 1, reference may be made to the implementation of the method in Embodiment 1 for implementation of the apparatus, with identical contents being not going to be described herein any further.

Figure 12:
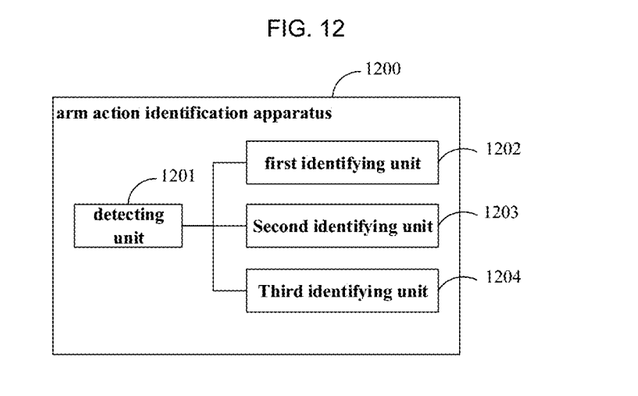
FIG. 12 is a schematic diagram of the arm action identification apparatus of Embodiment 2.

FIG. 12 is a schematic diagram of the arm action identification apparatus of the embodiment of this disclosure. As shown in FIG. 12, the arm action identification apparatus 1200 includes: a detecting unit 1201 and a first identifying unit 1202; wherein the detecting unit 1201 is configured to perform human body detection on an image to be detected, so as to obtain multiple key points of each human body in the image, and the first identifying unit 1202 is configured to identify whether an arm action is upward or downward by using a shoulder key point, an elbow key point and a wrist key point in the multiple key points.

In some embodiments, the detecting unit 1201 may perform human body detection on the image by using a cascade pyramid network (CPN) to obtain 17 key points of each human body in the image. However, the embodiment of this disclosure is not limited thereto, and other detection techniques capable of detecting key points of a human body may also be applicable to this disclosure.

Figure 13:
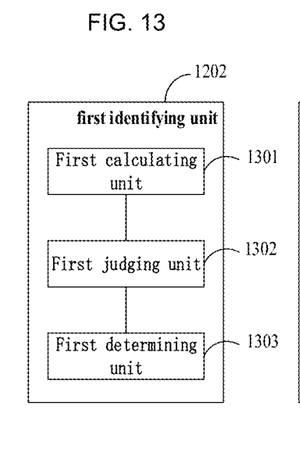
FIG. 13 is a schematic diagram of the first identifying unit of FIG. 12.

FIG. 13 is a schematic diagram of the first identifying unit 1202 of the embodiment of this disclosure. As shown in FIG. 13, the first identifying unit may include: a first calculating unit 1301, a first judging unit 1302 and a first determining unit 1303.

The first calculating unit 1301 calculates a height difference between the wrist key point and the elbow key point as a first height difference, or calculates a height difference between the elbow key point and the shoulder key point as a second height difference; the first judging unit 1302 judges whether the first height difference or the second height difference is greater than 0; and the first determining unit 1303 determines that the arm action is upward when it is judged yes by the first judging unit 1302, and determines that the arm action is downward when it is judged no by the first judging unit 1302.

The first calculating unit 1301 may calculate the first height difference according to the following formula:

$$dh\_we = y\_wrist - y\_elbow;$$

and the first calculating unit 1301 may calculate the second height difference according to the following formula:

$$dh\_es = y\_elbow - y\_shoulder;$$

where, dh_we is the first height difference, dh_es is the second height difference, and y_wrist, y_elbow and y_shoulder are respective ordinates of the wrist key point, the elbow key point and the shoulder key point.

Reference may be made to FIG. 3 in Embodiment 1 for a particular implementation of the first identifying unit 1202, which shall not be described herein any further.

In some embodiments, as shown in FIG. 12, the apparatus 1200 may further include:

a second identifying unit 1203, which is configured to identify whether the arm action is forward by using the shoulder key point, the elbow key point and the wrist key point in the multiple key points.

Figure 14:
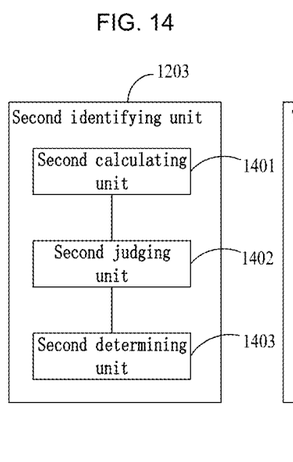
FIG. 14 is a schematic diagram of the second identifying unit of FIG. 12.

FIG. 14 is a schematic diagram of the second identifying unit 1203. As shown in FIG. 14, the second identifying unit 1203 may include a second calculating unit 1401, a second judging unit 1402 and a second determining unit 1403.

The second calculating unit 1401 calculates a ratio of a distance between the shoulder key point and the wrist key point to a sum of a distance between the shoulder key point and the elbow key point and a distance between the elbow key point and the wrist key point, or calculates an included angle between a connecting line between the shoulder key point and the elbow key point and a connecting line between the elbow key point and the wrist key point as a first included angle; the second judging unit 1402 judges whether the ratio is less than a first threshold or whether the first included angle is less than a second threshold; and the second determining unit 1403 determines that the arm action is forward when it is judged yes by the second judging unit 1402, and determines that the arm action is not forward when it is judged no by the second judging unit 1402.

The second calculating unit 1402 may calculate the ratio according to the following formula:

$$R = \frac{dist(\text{shoulder, wrist})}{dist(\text{shoulder, elbow}) + dist(\text{elbow, wrist})};$$

and the second calculating unit 1402 may calculate the first included angle according to the following formula:

$$\text{angel\_armbend} = \arccos\left(\frac{\vec{V}_{elbow \to shoulder} \cdot \vec{V}_{elbow \to wrist}}{|\vec{V}_{elbow \to shoulder}| \cdot |\vec{V}_{elbow \to wrist}|}\right);$$

where, R is the ratio, dist (k1, k2) is the distance between key points k1 and k2, k1 and k2 being the shoulder key point and the wrist key point, respectively, or being the shoulder key point and the elbow key point, respectively, or being the elbow key point and the wrist key point, respectively, angel_armbend is the first included angle, $\vec{V}_{elbow \to shoulder}$ is a vector point from the elbow key point to the shoulder key point, and $\vec{V}_{elbow \to wrist}$ is a vector point from the elbow key point to the wrist key point.

Reference may be made to FIG. 6 in Embodiment 1 for a particular implementation of the second identifying unit 1203, which shall not be described herein any further.

In some embodiments, as shown in FIG. 12, the apparatus 1200 may further include:

a third identifying unit 1204, which is configured to identify whether the arm action is forward by using the shoulder key point and the elbow key point in the multiple key points and a hip key point at the same side of the human body as the elbow key point.

Figure 15:
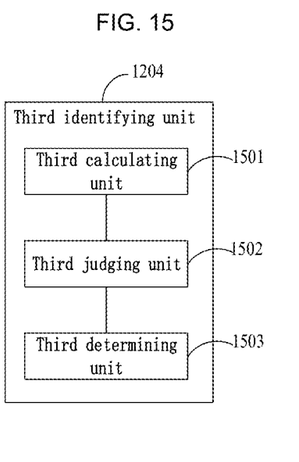
FIG. 15 is a schematic diagram of the third identifying unit of FIG. 12.

FIG. 15 is a schematic diagram of the third identifying unit 1204 of the embodiment of this disclosure. As shown in FIG. 15, the third identifying unit 1204 may include a third calculating unit 1501, a third judging unit 1502 and a third determining unit 1503.

The third calculating unit 1501 calculates an included angle between the connecting line between the shoulder key point and the elbow key point and a connecting line between the shoulder key point and the hip key point as a second included angle; the third judging unit 1502 judges whether the second included angle is greater than a third threshold value; and the third determining unit 1503 determines that the arm action is forward when it is judged yes by the third judging unit 1502, and determines that the arm action is not forward when it is judged no by the third judging unit 1502.

The third calculation unit 1501 may calculate the second included angle according to the following formula:

$$\text{angle\_ab} = \arccos\left(\frac{\vec{V}_{shoulder \to hip} \cdot \vec{V}_{shoulder \to elbow}}{|\vec{V}_{shoulder \to hip}| \cdot |\vec{V}_{shoulder \to elbow}|}\right);$$

where, angle_ab is the second included angle, $\vec{V}_{shoulder \to hip}$ is a vector point from the shoulder key point to the hip key point, and $\vec{V}_{shoulder \to elbow}$ is a vector point from the shoulder key point to the elbow key point.

Reference may be made to FIG. 10 in Embodiment 1 for a particular implementation of the third identifying unit 1204, which shall not be described herein any further.

In the embodiment of this disclosure, arm actions indicative of upward, downward, or forward, actions may be identified based upon, for example, lifting, putting down, holding forward, etc., actions, by using the key points of the human body, thereby achieving computer-level action identification, and lowering complexity of computation.

Embodiment 3

The embodiment of this disclosure provides an image processing device. The image processing device includes the arm action identification apparatus as described in Embodiment 2.

Figure 16:
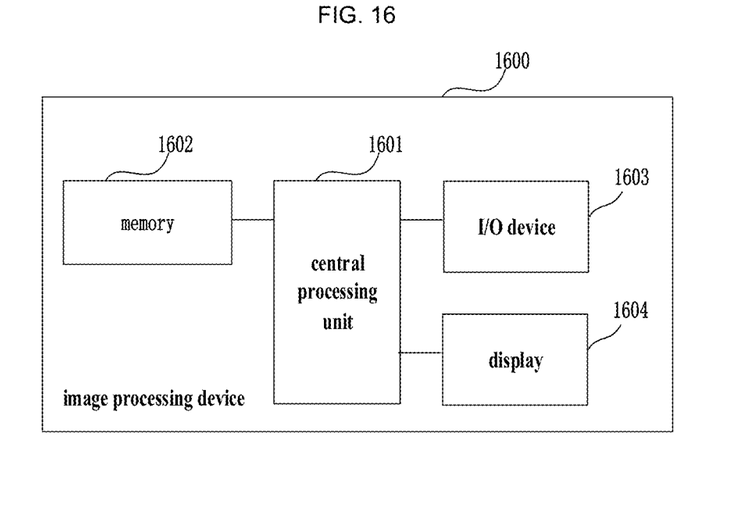
FIG. 16 is a schematic diagram of the image processing device of Embodiment 3.

FIG. 16 is a schematic diagram of the image processing device of the embodiment of this disclosure. As shown in FIG. 16, the image processing device 1600 may include a central processing unit (CPU) 1601 and a memory 1602, the memory 1602 being coupled to the central processing unit 1601. The memory 1602 may store various data, and furthermore, it may store a program for data processing, and execute the program under control of the central processing unit 1601.

In one implementation, the functions of the arm action identification apparatus 1200 may be integrated into the central processing unit 1601, wherein the central processing unit 1601 may be configured to carry out the arm action identification method described in Embodiment 1.

In another implementation, the arm action identification apparatus 1200 and the central processing unit 1601 may be configured separately; for example, the arm action identification apparatus 1200 may be configured as a chip connected to the central processing unit 1601, and the functions of the arm action identification apparatus 1200 are executed under control of the central processing unit 1601.

In some embodiments, the central processing unit 1601 may be configured to perform the following control: performing human body detection on an image to be detected, so as to obtain multiple key points of each human body in the image; and identifying whether an arm action is upward or downward by using a shoulder key point, an elbow key point and a wrist key point in the multiple key points.

Furthermore, as shown in FIG. 16, the image processing device 1600 may include an input/out (I/O) device 1603, and a display 1604, etc.; wherein functions of the above components are similar to those in the related art, which shall not be described herein any further. It should be noted that the image processing device does not necessarily include all the parts shown in FIG. 16, and furthermore, the image processing device 1600 may include parts not shown in FIG. 16, and the related art may be referred to.

An embodiment of this disclosure provides a computer readable program, which, when executed in an arm action identification apparatus or an image processing device, will cause the arm action identification apparatus or the image processing device to carry out the method described in Embodiment 1.

An embodiment of the present disclosure provides a medium, including a computer readable program, which will cause an arm action identification apparatus or an image processing device to carry out the method described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 12 may either correspond to software modules of procedures of a computer program, or correspond to hardware modules. Such software modules may respectively correspond to the steps shown in FIGS. 1, 3, 6 and 10. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

According to an aspect of an embodiment, an arm action identification method is provided, the method includes: performing human body detection on an image to be detected, so as to obtain multiple key points of each human body in the image; and identifying whether an arm action is upward or downward by using a shoulder key point, an elbow key point and a wrist key point in the multiple key points.

The performing of the human body detection on the image is by using a cascade pyramid network to obtain 17 key points of each human body in the image.

The identifying whether an arm action is upward or downward by using a shoulder key point, an elbow key point and a wrist key point in the multiple key points includes: calculating a height difference between the wrist key point and the elbow key point as a first height difference, or calculating a height difference between the elbow key point and the shoulder key point as a second height difference; judging whether the first height difference or the second height difference is greater than 0; and determining that the arm action is upward when it is judged yes, and determining that the arm action is downward when it is judged no.

The first height difference is obtained through calculation according to the following formula:

$$dh\_we = y\_wrist - y\_elbow;$$

and the second height difference is obtained through calculation according to the following formula:

$$dh\_es = y\_elbow - y\_shoulder;$$

where, dh_we is the first height difference, dh_es is the second height difference, and y_wrist, y_elbow and y_shoulder are respective ordinates of the wrist key point, the elbow key point and the shoulder key point.

The identifying of the arm action further includes: identifying whether the arm action is forward by using the shoulder key point, the elbow key point and the wrist key point in the multiple key points.

The identifying whether the arm action is forward by using the shoulder key point, the elbow key point and the wrist key point in the multiple key points, includes: calculating a ratio of a distance between the shoulder key point and the wrist key point to a sum of a distance between the shoulder key point and the elbow key point and a distance between the elbow key point and the wrist key point, or calculating an included angle between a connecting line between the shoulder key point and the elbow key point and a connecting line between the elbow key point and the wrist key point as a first included angle; judging whether the ratio is less than a first threshold or whether the first included angle is less than a second threshold; and determining that the arm action is forward when it is judged yes, and determining that the arm action is not forward when it is judged no.

The ratio is obtained through calculation according to the following formula:

$$R = \frac{dist(\text{shoulder, wrist})}{dist(\text{shoulder, elbow}) + dist(\text{elbow, wrist})};$$

and the first included angle is obtained through calculation according to the following formula:

$$\text{angel\_armbend} = \arccos\left(\frac{\vec{V}_{elbow \to shoulder} \cdot \vec{V}_{elbow \to wrist}}{|\vec{V}_{elbow \to shoulder}| \cdot |\vec{V}_{elbow \to wrist}|}\right);$$

where, R is the ratio, dist (k1, k2) is the distance between key points k1 and k2, k1 and k2 being the shoulder key point and the wrist key point, respectively, or being the shoulder key point and the elbow key point, respectively, or being the elbow key point and the wrist key point, respectively, angel_armbend is the first included angle, $\vec{V}_{elbow \to shoulder}$ is a vector point from the elbow key point to the shoulder key point, and $\vec{V}_{elbow \to wrist}$ is a vector point from the elbow key point to the wrist key point.

The identifying of the arm action further includes: identifying whether the arm action is forward or others by using the shoulder key point, the elbow key point and a hip key point at the same side of the human body as the elbow key point in the multiple key points.

The identifying whether the arm action is forward by using the shoulder key point, the elbow key point and a hip key point at the same side of the human body as the elbow key point in the multiple key points includes: calculating an included angle between the connecting line between the shoulder key point and the elbow key point and a connecting line between the shoulder key point and the hip key point as a second included angle; judging whether the second included angle is greater than a third threshold value; and determining that the arm action is forward when it is judged yes, and determining that the arm action is not forward when it is judged no.

The second included angle is obtained through calculation according to the following formula:

$$\text{angle\_ab} = \arccos\left(\frac{\vec{V}_{shoulder \to hip} \cdot \vec{V}_{shoulder \to elbow}}{|\vec{V}_{shoulder \to hip}| \cdot |\vec{V}_{shoulder \to elbow}|}\right);$$

where, angle_ab is the second included angle, $\vec{V}_{shoulder \to hip}$ is a vector point from the shoulder key point to the hip key point, and $\vec{V}_{shoulder \to elbow}$ is a vector point from the shoulder key point to the elbow key point.

According to an aspect of an embodiment, an image processing device is provided, the image processing device includes an arm action identification apparatus, the arm action identification apparatus including: a detecting unit configured to perform human body detection on an image to be detected, so as to obtain multiple key points of each human body in the image; and a first identifying unit configured to identify whether an arm action is upward or downward by using a shoulder key point, an elbow key point and a wrist key point in the multiple key points.

The first identifying unit includes: a first calculating unit configured to calculate a height difference between the wrist key point and the elbow key point as a first height difference, or calculate a height difference between the elbow key point and the shoulder key point as a second height difference; a first judging unit configured to judge whether the first height difference or the second height difference is greater than 0; and a first determining unit configured to determine that the arm action is upward when it is judged yes by the first judging unit, and determine that the arm action is downward when it is judged no by the first judging unit.

The arm action identification apparatus further includes: a second identifying unit configured to identify whether the arm action is forward by using the shoulder key point, the elbow key point and the wrist key point in the multiple key points.

The second identifying unit includes: a second calculating unit configured to calculate a ratio of a distance between the shoulder key point and the wrist key point to a sum of a distance between the shoulder key point and the elbow key point and a distance between the elbow key point and the wrist key point, or calculate an included angle between a connecting line between the shoulder key point and the elbow key point and a connecting line between the elbow key point and the wrist key point as a first included angle; a second judging unit configured to judge whether the ratio is less than a first threshold or whether the first included angle is less than a second threshold; and a second determining unit configured to determine that the arm action is forward when it is judged yes by the second judging unit, and determine that the arm action is not forward when it is judged no by the second judging unit.

The arm action identification apparatus further includes: a third identifying unit configured to identify whether the arm action is forward by using the shoulder key point, the elbow key point and a hip key point at the same side of the human body as the elbow key point in the multiple key points.

The third identifying unit includes: a third calculating unit configured to calculate an included angle between the connecting line between the shoulder key point and the elbow key point and a connecting line between the shoulder key point and the hip key point as a second included angle; a third judging unit configured to judge whether the second included angle is greater than a third threshold value; and a third determining unit configured to determine that the arm action is forward when it is judged yes by the third judging unit, and determine that the arm action is not forward when it is judged no by the third judging unit.

The invention claimed is:

1. An apparatus, comprising:
 a processor to couple to a memory and to,
  perform a detection of a human body in an image to obtain multiple key points of the human body in the image; and
  identify whether an arm action of the human body is an upward action or a downward action by using a shoulder key point, an elbow key point and a wrist key point in the multiple key points.

2. The apparatus according to claim 1, wherein the detection of the human body in the image is by using a cascade pyramid network to obtain 17 key points of the human body in the image.

3. The apparatus according to claim 1, wherein to identify the arm action, the processor is to:
 calculate a first height difference between the wrist key point and the elbow key point, or calculate a second height difference between the elbow key point and the shoulder key point;
 determine that the arm action is the upward action when the first height difference or the second height difference is greater than 0, and determine that the arm action is the downward action when the first height difference, or the second height difference, is equal to or less than 0.

4. The apparatus according to claim 3, wherein the processor is to,
 calculate the first height difference according to the following formula:

$$dh\_we = y\_\text{wrist} - y\_\text{elbow}; \text{ and}$$

calculate the second height difference according to the following formula:

$$dh\_es = y\_\text{elbow} - y\_\text{shoulder};$$

where, $dh\_we$ is the first height difference, $dh\_es$ is the second height difference, and $y\_\text{wrist}$, $y\_\text{elbow}$ and $y\_\text{shoulder}$ are respective ordinates of the wrist key point, the elbow key point and the shoulder key point.

5. The apparatus according to claim 1, wherein the processor is to:
 identify whether the arm action is a forward action by using the shoulder key point, the elbow key point and the wrist key point in the multiple key points.

6. The apparatus according to claim 5, wherein to identify whether the arm action is the forward action, the processor is to:
 calculate a ratio of a distance between the shoulder key point and the wrist key point to a sum of a distance between the shoulder key point and the elbow key point and a distance between the elbow key point and the wrist key point, or calculate a first included angle between a connecting line between the shoulder key point and the elbow key point and a connecting line between the elbow key point and the wrist key point; and
 determine that the arm action is the forward action when the ratio is less than a first threshold, or when the first included angle is less than a second threshold.

7. The apparatus according to claim 6, wherein the processor is to,
 calculate the ratio according to the following formula:

$$R = \frac{dist(\text{shoulder, wrist})}{dist(\text{shoulder, elbow}) + dist(\text{elbow, wrist})};$$

and
 calculate the first included angle according to the following formula:

$$\text{angel\_armbend} = \arccos\left(\frac{\vec{V}_{elbow \to shoulder} \cdot \vec{V}_{elbow \to wrist}}{|\vec{V}_{elbow \to shoulder}| \cdot |\vec{V}_{elbow \to wrist}|}\right);$$

where, R is the ratio, dist (k1, k2) is the distance between key points k1 and k2, k1 and k2 being the shoulder key point and the wrist key point, respectively, or being the shoulder key point and the elbow key point, respectively, or being the elbow key point and the wrist key point, respectively, angel_armbend is the first included angle, $\vec{V}_{elbow \to shoulder}$ is a vector point from the elbow key point to the shoulder key point, and $\vec{V}_{elbow \to wrist}$ is a vector point from the elbow key point to the wrist key point.

8. The apparatus according to claim 1, wherein the processor is to:

identify whether the arm action is a forward action by using the shoulder key point, the elbow key point and a hip key point at a same side of the human body as the elbow key point in the multiple key points.

9. The apparatus according to claim 8, wherein to identify whether the arm action is the forward action, the processor is to:
calculate a second included angle between a connecting line between the shoulder key point and the elbow key point and a connecting line between the shoulder key point and the hip key point;
determine that the arm action is the forward action when the second included angle is greater than a third threshold value.

10. The apparatus according to claim 9, wherein the processor is to,
calculate the second included angle according to the following formula:

$$\text{angle\_ab} = \arccos\left(\frac{\vec{V}_{shoulder \to hip} \cdot \vec{V}_{shoulder \to elbow}}{|\vec{V}_{shoulder \to hip}| \cdot |\vec{V}_{shoulder \to elbow}|}\right);$$

where, angle_ab is the second included angle, $\vec{V}_{shoulder \to hip}$ is a vector point from the shoulder key point to the hip key point, and $\vec{V}_{shoulder \to elbow}$ is a vector point from the shoulder key point to the elbow key point.

11. An image processing device, comprising:
an arm action identification apparatus including a processor to couple to a memory and to,
perform a detection of a human body in an image to obtain multiple key points of the human body in the image; and
identify whether an arm action of the human body is an upward action or a downward action by using a shoulder key point, an elbow key point and a wrist key point in the multiple key points.

12. The image processing device according to claim 11, wherein to identify the arm action, the processor is to:
calculate a first height difference between the wrist key point and the elbow key point, or calculate a second height difference between the elbow key point and the shoulder key point;
determine that the arm action is the upward action when the first height difference, or the second height difference, is greater than 0, and determine that the arm action is the downward action when the first height difference, or the second height difference, is equal to or less than 0.

13. The image processing device according to claim 11, wherein the processor is to:
identify whether the arm action is a forward action by using the shoulder key point, the elbow key point and the wrist key point in the multiple key points.

14. The image processing device according to claim 13, wherein to identify whether the arm action is the forward action, the processor is to:
calculate a ratio of a distance between the shoulder key point and the wrist key point to a sum of a distance between the shoulder key point and the elbow key point and a distance between the elbow key point and the wrist key point, or calculate a first included angle between a connecting line between the shoulder key point and the elbow key point and a connecting line between the elbow key point and the wrist key point as a first included angle; and
determine the arm action is the forward action when the ratio is less than a first threshold, or when the first included angle is less than a second threshold.

15. The image processing device according to claim 11, wherein the processor is to:
identify whether the arm action is a forward action by using the shoulder key point, the elbow key point and a hip key point at a same side of the human body as the elbow key point in the multiple key points.

16. The image processing device according to claim 15, wherein to determine whether the arm action is the forward action, the processor is to:
calculate a second included angle between a connecting line between the shoulder key point and the elbow key point and a connecting line between the shoulder key point and the hip key point;
determine that the arm action is the forward action when the second included angle is greater than a third threshold value.

* * * * *